US012118977B2

(12) United States Patent
Ahn et al.

(10) Patent No.: US 12,118,977 B2
(45) Date of Patent: *Oct. 15, 2024

(54) TERMINAL AND OPERATING METHOD THEREOF

(71) Applicant: Hyperconnect LLC, Seoul (KR)

(72) Inventors: Sang Il Ahn, Cheongju-si (KR); Ju Young Hong, Seongnam-si (KR); Yong Uk Jeong, Incheon (KR)

(73) Assignee: Hyperconnect LLC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,860

(22) Filed: Mar. 14, 2023

(65) Prior Publication Data

US 2023/0215418 A1 Jul. 6, 2023

Related U.S. Application Data

(63) Continuation of application No. 16/987,111, filed on Aug. 6, 2020, now Pat. No. 11,615,777.

(30) Foreign Application Priority Data

Aug. 9, 2019 (KR) ........................ 10-2019-0097398

(51) Int. Cl.
*G10L 17/00* (2013.01)
*G10L 13/033* (2013.01)
(Continued)

(52) U.S. Cl.
CPC ............ *G10L 13/033* (2013.01); *G10L 13/04* (2013.01); *G10L 17/04* (2013.01); *H04L 65/611* (2022.05)

(58) Field of Classification Search
CPC ......... G10L 17/00; G10L 25/78; G10L 13/00; G10L 15/052; G10L 2021/0135;
(Continued)

(56) References Cited

U.S. PATENT DOCUMENTS 6,571,234 B1 * 5/2003 Knight .................... G06Q 10/10
6,731,307 B1 * 5/2004 Strubbe ................ H04N 21/466
715/764

(Continued)

FOREIGN PATENT DOCUMENTS

CN 112541060 A 3/2021
JP H0772900 A 3/1995
(Continued)

OTHER PUBLICATIONS

Extended European Search Report for Application No. 20189677.6, Dated Sep. 28, 2020, 9 Pgs.
(Continued)

*Primary Examiner* — Jakieda R Jackson
(74) *Attorney, Agent, or Firm* — KPPB LLP

(57) ABSTRACT

A terminal may include a display that is divided into at least two areas, when a real time broadcasting, where a user of the terminal is a host, starts through a broadcasting channel, and of which one area of the at least two areas is allocated to the host; an input/output interface that receives a voice of the host; a communication interface that receives one item selected of at least one or more items and a certain text from a terminal of a certain guest, of at least one or more guests who entered the broadcasting channel; and a processor that generates a voice message converted from the certain text into the voice of the host or a voice of the certain guest.

20 Claims, 7 Drawing Sheets

(51) Int. Cl.
*G10L 13/04* (2013.01)
*G10L 17/04* (2013.01)
*H04L 65/611* (2022.01)

(58) Field of Classification Search
CPC ....... G10L 13/03; G10L 13/08; G10L 13/033;
G10L 15/22; G10L 2015/223; G10L
15/063; G10L 17/04; G06F 16/337; G06F
2203/04803; G06F 3/167
See application file for complete search history.

(56) References Cited

U.S. PATENT DOCUMENTS

| | | | |
|---|---|---|---|
| 6,735,615 B1* | 5/2004 | Iwayama | H04L 43/00 709/204 |
| 6,804,647 B1 | 10/2004 | Heck et al. | |
| 6,804,675 B1* | 10/2004 | Knight | G06Q 10/107 707/754 |
| 7,277,855 B1 | 10/2007 | Acker et al. | |
| 7,685,237 B1* | 3/2010 | Weaver | H04L 51/04 709/205 |
| 10,176,819 B2* | 1/2019 | Sun | G10L 15/187 |
| 10,930,263 B1* | 2/2021 | Mahyar | G06N 3/088 |
| 11,615,777 B2 | 3/2023 | Ahn et al. | |
| 11,645,547 B2 | 5/2023 | Tian et al. | |
| 2002/0120450 A1* | 8/2002 | Junqua | G10L 13/04 704/258 |
| 2004/0111271 A1* | 6/2004 | Tischer | G10L 13/033 704/277 |
| 2005/0144247 A1* | 6/2005 | Christensen | H04L 51/04 709/207 |
| 2006/0149558 A1* | 7/2006 | Kahn | G10L 15/063 704/278 |
| 2006/0210034 A1* | 9/2006 | Beadle | G06Q 10/107 379/88.22 |
| 2006/0235932 A1* | 10/2006 | Celi | H04L 12/1822 709/207 |
| 2007/0005754 A1* | 1/2007 | Horvitz | H04L 67/22 709/224 |
| 2007/0071206 A1* | 3/2007 | Gainsboro | H04M 3/42221 379/168 |
| 2008/0082333 A1* | 4/2008 | Nurminen | G10L 21/00 704/250 |
| 2008/0147385 A1* | 6/2008 | Nurminen | G10L 21/00 704/223 |
| 2008/0183473 A1* | 7/2008 | Nagano | G10L 13/07 704/E13.011 |
| 2008/0207242 A1* | 8/2008 | Ekberg | H04W 4/08 455/518 |
| 2008/0235024 A1 | 9/2008 | Goldberg et al. | |
| 2009/0037179 A1* | 2/2009 | Liu | G10L 13/08 704/260 |
| 2009/0171657 A1* | 7/2009 | Tian | G10L 21/00 704/219 |
| 2009/0177473 A1* | 7/2009 | Aaron | G10L 13/033 704/260 |
| 2009/0204510 A1* | 8/2009 | Hwang | G06Q 20/40 705/40 |
| 2010/0161327 A1* | 6/2010 | Chandra | G10L 15/1807 704/235 |
| 2012/0189272 A1* | 7/2012 | Kunigita | H04N 21/4788 386/239 |
| 2012/0226500 A1* | 9/2012 | Balasubramanian | G10L 13/033 704/260 |
| 2013/0332167 A1* | 12/2013 | Kilgore | G10L 15/22 704/E15.005 |
| 2014/0195227 A1* | 7/2014 | Rudzicz | G10H 1/366 704/231 |
| 2014/0303958 A1* | 10/2014 | Lee | G06F 40/58 704/2 |
| 2015/0379654 A1* | 12/2015 | Deshmukh | G06Q 50/205 705/326 |
| 2016/0005403 A1* | 1/2016 | Agiomyrgiannakis | G10L 15/07 704/246 |
| 2016/0036962 A1* | 2/2016 | Rand | H04W 76/25 455/418 |
| 2016/0104474 A1* | 4/2016 | Bunn | G10L 21/003 704/261 |
| 2016/0203827 A1* | 7/2016 | Leff | G10L 19/125 704/207 |
| 2016/0379643 A1* | 12/2016 | Ito | G10L 15/1822 704/270.1 |
| 2017/0171509 A1* | 6/2017 | Huang | H04L 51/10 |
| 2017/0171599 A1 | 6/2017 | Peng | |
| 2017/0249953 A1* | 8/2017 | Yassa | G10L 13/06 |
| 2017/0301340 A1* | 10/2017 | Yassa | G10L 13/047 |
| 2018/0048865 A1* | 2/2018 | Taylor | H04N 7/14 |
| 2018/0063556 A1* | 3/2018 | Kalmanson | H04N 21/234 |
| 2018/0090126 A1* | 3/2018 | Peterson | G10L 13/08 |
| 2018/0130471 A1* | 5/2018 | Trufinescu | G10L 15/26 |
| 2018/0204576 A1* | 7/2018 | Dhoot | H04L 65/1083 |
| 2018/0316964 A1* | 11/2018 | Dillon | G06F 3/04817 |
| 2019/0044985 A1* | 2/2019 | Jo | H04L 65/4053 |
| 2019/0079941 A1* | 3/2019 | Sarkar | H04L 67/306 |
| 2019/0108242 A1 | 4/2019 | Liu et al. | |
| 2019/0221225 A1* | 7/2019 | Bricklin | G10L 13/033 |
| 2019/0251952 A1* | 8/2019 | Arik | G10L 13/08 |
| 2019/0334842 A1 | 10/2019 | Sato | |
| 2019/0354594 A1 | 11/2019 | Foster et al. | |
| 2020/0013422 A1* | 1/2020 | Matkin | G10L 21/0232 |
| 2020/0082807 A1 | 3/2020 | Kim et al. | |
| 2020/0197810 A1* | 6/2020 | Kung | H04N 21/4788 |
| 2020/0265829 A1* | 8/2020 | Liu | G10L 13/033 |
| 2020/0395008 A1 | 12/2020 | Cohen et al. | |
| 2021/0020161 A1 | 1/2021 | Gao | |
| 2021/0043187 A1 | 2/2021 | Ahn et al. | |
| 2021/0217404 A1 | 7/2021 | Jia et al. | |
| 2022/0199068 A1 | 6/2022 | Ahn et al. | |
| 2022/0246136 A1 | 8/2022 | Yang et al. | |
| 2023/0077528 A1 | 3/2023 | Erdenee et al. | |
| 2023/0080930 A1 | 3/2023 | Seo et al. | |
| 2023/0154453 A1 | 5/2023 | Erdenee et al. | |
| 2023/0229864 A1 | 7/2023 | Kim et al. | |
| 2023/0229964 A1 | 7/2023 | Kim et al. | |

FOREIGN PATENT DOCUMENTS

| | | |
|---|---|---|
| JP | 2003202885 A | 7/2003 |
| JP | 2018004977 A | 1/2018 |
| JP | 2019179257 A | 10/2019 |
| JP | 2020160319 A | 10/2020 |
| KR | 20000036463 A | 7/2000 |
| KR | 20010091677 A | 10/2001 |
| KR | 20090028151 A | 3/2009 |
| KR | 101632435 B1 | 6/2016 |
| KR | 20170107683 A | 9/2017 |
| KR | 20180059322 A | 6/2018 |
| KR | 20190008137 A | 1/2019 |
| KR | 20190085882 A | 7/2019 |
| KR | 10-2170563 B1 | 10/2020 |
| KR | 10-2173553 B1 | 11/2020 |
| WO | 2018074516 A1 | 4/2018 |
| WO | 2019139430 A1 | 7/2019 |
| WO | 2019222591 A1 | 11/2019 |

OTHER PUBLICATIONS

Japanese Office Action for Application No. 2020-134046, Dated Sep. 10, 2021, 8 Pgs.
Korean Office Action for Application No. 10-2019-0097398, Dated Aug. 18, 2021, 15 Pgs.
Korean Office Action for Application No. 10-2019-0097398, Dated Jun. 25, 2020, 11 Pgs.
Extended European Search Report for Application No. 22207004.7 dated Mar. 9, 2023, 9 pgs.
Extended European Search Report for Application No. 22189981.8, mailed Jan. 17, 2023, 9 pgs.

(56) References Cited

OTHER PUBLICATIONS

Office Action for Japanese Patent Application No. 2021-083959 dated Sep. 28, 2022, 2 pgs.

Adiwardana et al., "Towards a Human-like Open-Domain Chatbot", arXiv:2001.09977v3 [cs.CL], Feb. 27, 2020, 38 pgs.

Brown et al., "Language Models are Few-Shot Learners", arXiv:2005.14165v4 [cs.CL], Jul. 22, 2020, 75 pgs.

Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3-7, 2019, pp. 1866-1875.

Cai et al., "Skeleton-to-Response: Dialogue Generation Guided by Retrieval Memory", arXiv:1809.05296v5 [cs.CL], Feb. 28, 2020, 8 pgs.

Choi et al., "Attentron: Few-Shot Text-to-Speech Utilizing Attention-Based Variable-Length Embedding", ArXiv abs/2005.08484, Aug. 12, 2020 (Version 2), 5 pgs.

Choi et al., "Attentron: Few-Shot Text-to-Speech Utilizing Attention-Based Variable-Length Embedding", ArXiv abs/2005.08484, May 18, 2020 (Version 1), 5 pgs.

Cooper et al., "Zero-Shot Multi-Speaker Text-to-Speech with State-of-the-Art Neural Speaker Embeddings", arXiv:1910.10838v2, Feb. 4, 2020, 5 pgs.

Fan et al., "Augmenting Transformers with KNN-Based Composite Memory for Dialog", Transactions of the Association for Computational Linguistics, vol. 9, Mar. 1, 2021, pp. 82-99, https://doi.org/10.1162/tacl_a_00356.

Fu et al., "Stylistic Retrieval-based Dialogue System with Unparallel Training Data", arXiv:2109.05477, Sep. 12, 2021, 9 pgs.

Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029.

Guu et al., "REALM: Retrieval-Augmented Language Model Pre-Training", arXiv:2002.08909v1 [cs.CL], Feb. 10, 2020, 12 pgs.

Han et al., "Meet Your Favorite Character: Open-domain Chatbot Mimicking Fictional Characters with only a Few Utterances", arXiv:2204.10825, Apr. 22, 2022, 19 pgs.

Holtzman et al., "The Curious Case of Neural Text Degeneration", arXiv:1904.09751v2 [cs.CL], Feb. 14, 2020, 16 pgs.

Hsu et al., "Hierarchical generative modeling for controllable speech synthesis", arXiv preprint arXiv:1810.07217v2, Dec. 27, 2018, 27 pgs.

Humeau et al., "Poly-Encoders: Architectures and Pre-Training Strategies for Fast and Accurate Multi-Sentence Scoring", International Conference on Learning Representations, Apr. 30, 2020, 14 pgs.

Kim et al., "Distilling the Knowledge of Large-scale Generative Models into Retrieval Models for Efficient Open-domain Conversation", Findings of the Association for Computational Linguistics, EMNLP 2021, Nov. 7-11, 2021, pp. 3357-3373.

Kim et al., "Sequence-Level Knowledge Distillation", Proceedings of the 2016 Conference on Empirical Methods in Natural Language Processing, Austin, TX, Nov. 1-5, 2016, pp. 1317-1327.

Lee et al., "Robust and Fine-Grained Prosody Control of End-to-End Speech Synthesis", arXiv:1811.02122v2, Feb. 18, 2019, 5 pgs.

Lewis et al., "Retrieval-Augmented Generation for Knowledge-Intensive NLP Tasks", arXiv:2005.11401v4 [cs.CL], Apr. 12, 2021, 19 pgs.

Li et al., "A Diversity-Promoting Objective Function for Neural Conversation Models", Proceedings of NAACL-HLT 2016, San Diego, California, Jun. 12-17, 2016, pp. 110-119.

Li et al., "Don't Say That! Making Inconsistent Dialogue Unlikely with Unlikelihood Training", arXiv:1911.03860v2 [cs.CL], May 6, 2020, 15 pgs.

Liu et al., "How NOT to Evaluate Your Dialogue System: an Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.

Mazare et al., "Training Millions of Personalized Dialogue Agents", arXiv:1809.01984v1 [cs.CL], Sep. 6, 2018, 5 pgs.

Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.

Roller et al., "Recipes for building an open-domain chatbot", arXiv:2004.13637v2 [cs.CL], Apr. 30, 2020, 25 pgs.

Serban et al., "Multiresolution Recurrent Neural Networks: an Application to Dialogue Response Generation", arXiv:1606.00776v2 [cs.CL], Jun. 14, 2016, 21 pgs.

Welleck et al., "Neural Text Degeneration with Unlikelihood Training", arXiv:1908.04319v2 [cs.LG], Sep. 26, 2019, 17 pgs.

Weston et al., "Retrieve and Refine: Improved Sequence Generation Models for Dialogue", arXiv:1808.04776v2 [cs.CL], Sep. 6, 2018, 6 pgs.

Wu et al., "Response Generation by Context-aware Prototype Editing", arXiv:1806.07042v4 [cs.CL], Nov. 16, 2018, 9 pgs.

Yang et al., "A Hybrid Retrieval-Generation Neural Conversation Model", arXiv:1904.09068v1 [cs.IR], Apr. 19, 2019, 11 pgs.

Zhang, et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.

Zhang et al., "DIALOGPT: Large-Scale Generative Pre-training for Conversational Response Generation", Proceedings of the 58th Annual Meeting of the Association for Computational Linguistics, Jul. 5-10, 2020, pp. 270-278.

Office Action for Japanese Patent Application No. 2022-103809 mailed Aug. 9, 2024, 4 pages.

"Launch of "Koestation," a smartphone app that uses voice synthesis to create an avatar of your own voice", Toshiba Digital Solutions Corporation, Apr. 17, 2018, 8 pages, obtained from https://www.global.thoshiba/jp/company/digitalsolutions/news/2018/0417.html.

"Trends in live streaming services (tipping, etc.)", Mitsubishi UFJ Research and Consulting, 64 pages, obtained from https://www.caa.go.jp/policies/policy/consumer_policy/policy_coordination/internet_committee/pdf/internet_committee_190117_0002.pdf.

* cited by examiner

TERMINAL AND OPERATING METHOD THEREOF

CROSS-REFERENCE TO RELATED APPLICATIONS

This application is a continuation of U.S. patent application Ser. No. 16/987,111 filed Aug. 6, 2020, which claims the benefit of Korean Patent Application No. 10-2019-0097398 filed Aug. 9, 2019 in the Korean Intellectual Property Office, the disclosures of which are incorporated herein in their entireties by reference.

1. FIELD

The disclosed embodiments relate to a terminal that converts a text into a voice more effectively, and an operating method thereof.

2. BACKGROUND

With the development of communication technology and miniaturization of electronic devices, personal terminals are being widely used by general consumers. In particular, portable personal terminals such as smart phones or smart tablets have been widely used in recent years. Most of the terminals comprise communication functions. Users can search the internet or exchange messages with other users using terminals.

Further, with the development of miniaturized camera technology, miniaturized microphone technology, miniaturized display technology and miniaturized speaker technology, most of the terminals such as smart phones are being equipped with cameras, microphones, displays and speakers. Users can record a voice or record a video that includes a voice using terminals. Users can check the recorded voice through a speaker included in the terminal or check the recorded video through a display.

Users can transmit the voice that is currently being recorded or the video that is currently being recorded to at least one other user in real time. This at least one other user can check the video or voice that is currently being recorded by the terminal of the other user through a terminal.

SUMMARY

According to the disclosed embodiments, a terminal that is capable of performing real time broadcasting more effectively, and an operating method thereof may be provided.

Further, according to the embodiments, a terminal that is capable of expanding human relations through real time broadcasting service, and an operating method thereof may be provided.

An operating method of a terminal that provides a service for performing a real time broadcasting through a broadcasting channel, according to an embodiment of the present disclosure may include starting the real time broadcasting where a user of the terminal is a host, through the broadcasting channel; when the real time broadcasting is started, dividing a display of the terminal into at least two areas, and allocating one area of the at least two areas to the host; recognizing a voice of the host during the real time broadcasting; receiving one item that is selected of at least one or more items and a certain text, from a terminal of a certain guest, of at least one or more guests who entered the broadcasting channel; generating a voice message converted from the certain text into the voice of the host or a voice of the certain guest; and outputting the voice message.

In some embodiments, the operating method of the terminal may further include preparing an algorithm for generating the voice message converted from the certain text into the voice of the host.

In some embodiments, the generating the voice message converted from the certain text into the voice of the host may comprise generating the voice message by applying the voice of the host and the certain text to the algorithm.

In some embodiments, the preparing the algorithm for generating the voice message converted from the certain text into the voice of the host may comprise preparing a learning model learned regarding a correlation between a plurality of voices, a plurality of texts, and a plurality of voice messages converted from the plurality of texts into the plurality of voices, respectively.

In some embodiments, the operating method of the terminal may further include extracting voice characteristics from the voice of the host; generating a comparison voice based on the extracted voice characteristics; comparing the voice of the host and the comparison voice; and storing the voice characteristics depending on a result of the comparison.

In some embodiments, the comparing the voice of the host and the comparison voice may comprise calculating an error of sampling values between the voice of the host and the comparison voice, and the storing the voice characteristics depending on the result of the comparison may comprise storing the voice characteristics in response to the error being not more than a standard value.

In some embodiments, the generating the voice message converted from the certain text into the voice of the host may comprise generating the voice message based on the certain text and the voice characteristics.

In some embodiments, the at least one or more items may have commodity values within the service.

In some embodiments, the operating method of the terminal may further include directly participating in the broadcasting by a first guest, of the at least one or more guests, who entered the broadcasting channel; and allocating an area other than the area allocated to the host, of the at least two areas of the display, to the first guest.

A terminal according to an embodiment of the present disclosure may include a display; an input/output interface; a communication interface; a processor; and a memory configured to store instructions executable by the processor, wherein the processor is configured to execute the instructions for starting a real time broadcasting where a user of the terminal is a host, through a broadcasting channel, dividing the display into at least two areas, when the real time broadcasting, and allocating one area of the at least two areas to the host; recognizing a voice of the host received through the input/output interface during the real time broadcasting; receiving one item selected of at least one or more items and a certain text from a terminal of a certain guest, of at least one or more guests who entered the broadcasting channel through the communication interface; and generating a voice message converted from the certain text into the voice of the host or a voice of the certain guest.

In some embodiments, the processor may prepare a learning model learned regarding a correlation between a plurality of voices, a plurality of texts, and a plurality of voice messages converted from the plurality of texts into the plurality of voices, respectively, and generate the voice message by applying the voice of the host and the certain text to the learning model.

In some embodiments, the terminal may further include a memory that stores the learning model.

In some embodiments, the processor may extract voice characteristics from the voice of the host, generate a comparison voice based on the extracted voice characteristics, compare the voice of the host and the comparison voice, and depending on a result of the comparison, generate the voice message based on the certain text and the voice characteristics.

In some embodiments, when a first guest, of the at least one or more guests who entered the broadcasting channel, directly participates in the broadcasting, the processor may control the display such that an area other than the area allocated to the host, of the at least two areas of the display, may be allocated to the first guest.

A terminal according to the disclosed embodiments, and an operating method thereof can perform real time broadcasting more effectively.

Further, a terminal according to the disclosed embodiments, and an operating method thereof can expand human relations through real time broadcasting service.

DETAILED DESCRIPTION

Figure 1:
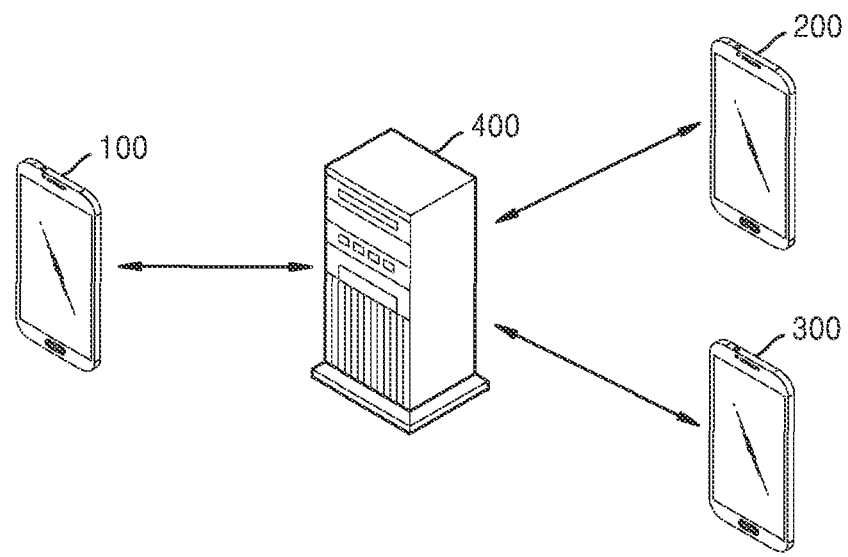
FIG. 1 is a system configuration view illustrating an environment where a terminal according to an embodiment of the present disclosure operates.

The advantages and characteristics of the present disclosure, and the method for achieving those advantages and characteristics will be clarified with reference to the embodiments that will be described hereinafter together with the drawings attached hereto. However, the present disclosure is not limited to the embodiments disclosed hereinafter, but may be implemented in various different forms, and the present embodiments are provided merely for the purpose of complete disclosure of the present disclosure, and for the purpose of informing a person skilled in the art of the complete scope of the present disclosure, and the present disclosure is to be defined only by the scope of the claims. Like reference numerals indicate like components throughout the entirety of the specification.

Even though "a first" or "a second" and the like are used to describe various components, these components are not limited by the aforementioned terms. The aforementioned terms can only be used to differentiate one component from other components. Therefore, a first component mentioned hereinafter may be a second component within the technical idea of the present disclosure.

The terms used in the present specification were used to describe the embodiments, and not to limit the present disclosure. In the present specification, a singular form includes plural forms unless specially mentioned otherwise. "Comprises" or "comprising" used in the present specification imply that the mentioned component or step does not exclude the presence or addition of one or more other component or step.

Unless defined otherwise, all the terms used in the present specification may be construed to mean what may be commonly understood by a person skilled in the art. Further, the terms defined in generally used dictionaries should not be construed ideally or overly unless clearly defined specially.

FIG. 1 is a system configuration view illustrating an environment where a terminal according to an embodiment of the present disclosure operates.

Referring to FIG. 1, an environment where a plurality of terminals 100~300 operate may include a server 400, and the plurality of terminals 100~300. For example, the environment where the plurality of terminals 100~300 operate may include at least one or more servers.

Each of the plurality of terminals 100~300 may be connected by medium of the server 400. For convenience description of the present disclosure, three terminals are illustrated in FIG. 1, but the number of terminals is not limited to three. Each of the plurality of terminals 100~300 may be embodied as one of a desktop computer, laptop computer, smart phone, smart tablet, smart watch, mobile terminal, digital camera, wearable device, and portable terminal. Each of the plurality of terminals 100~300 may execute a program or an application.

Each of the plurality of terminals 100~300 may be connected to a communication network. Each of the plurality of terminals 100~300 may be connected to each other or may be connected with the server 400 through the communication network. Each of the plurality of terminals 100~300 may output data to the interconnected device or receive data from the interconnected device.

The communication network connected to each of the plurality of terminals 100~300 may include a wired communication network, wireless communication network, or composite communication network. The communication network may include a mobile communication network such as 3G, LTE, or LTE-A, etc. The communication network may include a wired or wireless communication network such as Wi-Fi, UMTS/GPRS, or Ethernet, etc. The communication network may include a local area communication network such as Magnetic Secure Transmission (MST), Radio Frequency IDentification (RFID), Near Field Communication (NFC), ZigBee, Z-Wave, Bluetooth, Bluetooth Low Energy (BLE), or InfraRed communication (IR), etc. The communication network may include Local Area Network (LAN), Metropolitan Area Network (MAN), or Wide Area Network (WAN), etc.

Various forms of communication sessions may be established between the plurality of terminals 100~300. For example, the plurality of terminals 100~300 may exchange messages, files, voice data, images or videos with each other. For example, the plurality of terminals 100~300 may perform real time broadcasting using a Transmission Control Protocol (TCP), User Datagram Protocol (UDP), or Web Real-Time Communication (WebRTC), etc.

In some embodiments, in the plurality of terminals 100~300, an application enabling real time broadcasting to be performed or to be viewed may be installed. A user of the first terminal 100, of the plurality of terminals 100~300, may generate a broadcasting channel for performing the real time broadcasting through the application.

Further, each user of the second and third terminals 200, 300, of the plurality of terminals 100~300, may enter the broadcasting channel that the user of the first terminal 100 generated, through the application. Each user of the second and third terminal 200, 300 may view the broadcasting being conducted by the user of the first terminal 100 in real time.

In some embodiments, at least one of the user of the second terminal 200 and the user of the third terminal 300 may participate in the broadcasting that the user of the first terminal 100 generated and conduct the real time broadcasting together. A screen divided into two being displayed on each display of the plurality of terminals 100~300 may each be allocated to the user participating in the broadcasting, of the user of the first terminal 100, the user of the second terminal 200, and the user of the third terminal 300.

The server 400 may connect the plurality of terminals 100~300 so that they can perform communication with each other. For example, the server 400 may provide a real time broadcasting service so that the plurality of terminals 100~300 can form and participate in a real time broadcasting channel.

One or more exemplary embodiments, terminal may include mobile terminals, electronic devices, cellular phones, smart phones, laptop computers, tablet PCs, electronic book terminals, digital broadcasting terminals, personal digital assistants (PDAs), portable multimedia players (PMPs), navigations, MP3 players, digital cameras, etc. However, the terminal is not limited thereto.

Figure 2:
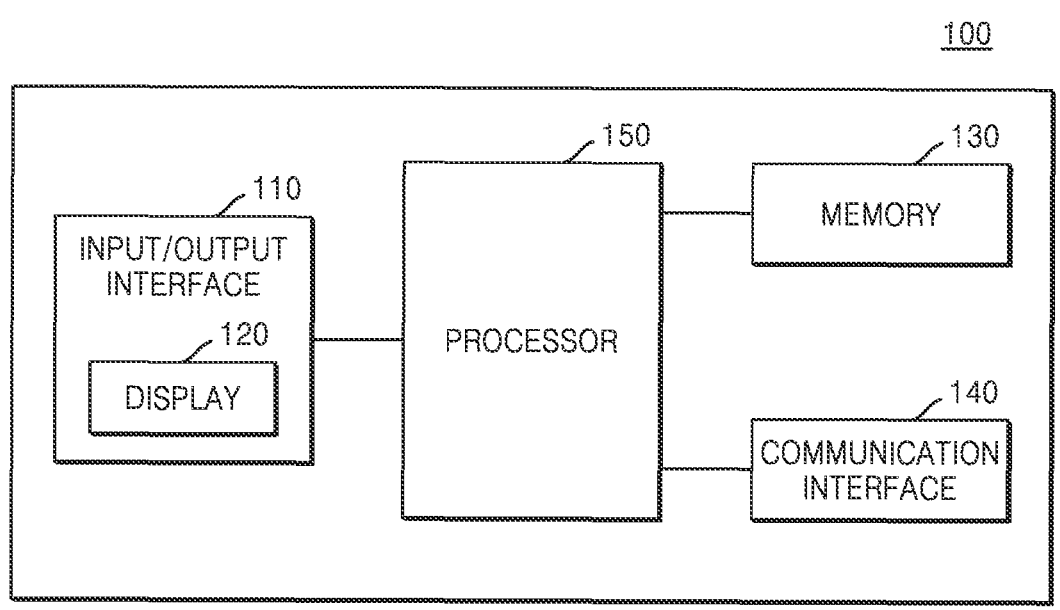
FIG. 2 is a block diagram illustrating a configuration of a terminal according to an embodiment of the present disclosure.

FIG. 2 is a block diagram illustrating a configuration of a terminal according to an embodiment of the present disclosure. Referring to FIG. 2, the first terminal 100 may include an input/output interface 110, a display 120, a memory 130, a communication interface 140, and a processor 150. Each of the second terminal 200 and the third terminal 300 illustrated in FIG. 1 may be embodied similarly or identically as the first terminal 100.

The input/output interface 110 may receive signals from outside. The input/output interface 110 may receive the signals from a user of the first terminal 100. Further, the input/output interface 110 may receive the signals from an external device. The input/output interface 110 may include, for example, a microphone, camera, keyboard, mouse, trackball, touchscreen, button, switch, sensor, network interface, or other input devices, etc. The input/output interface 110 may receive voices from outside through the microphone included in the input/output interface 110.

Further, the input/output interface 110 may receive images or videos recorded from the camera (not illustrated) included in the input/output interface 110, or receive gestures from the user of the terminal 100.

The input/output interface 110 may include a display 120. For example, the display 120 may include a flat panel display device such as Liquid Crystal Display (LCD), Organic Light Emitting Diode (OLED), or Plasma Display Panel (PDP), etc. The display 120 may include a curved-surface display or a flexible display. The display 120 may include a touchscreen. In a case where the display 120 includes the touchscreen, the display 120 may receive a touch input from the user of the first terminal 100.

The display 120 may display data. Further, the display 120 may display a result of computation performed by the processor 150. Further, the display 120 may display data stored in the memory 130. The display 120 may display the data received through the input/output interface 110 or display the data received by the communication interface 140.

In some embodiments, in a case where the real time broadcasting application is being executed in the first terminal 100, the display 120 may output an image of the user of the first terminal 100. Further, in a case where an image of the user of the second terminal 200 or an image of the user of the third terminal 300 is being received through the communication interface 140, the display 120 may output the image of the user of the second terminal 200 or the image of the user of the third terminal 300 together with the image of the user of the first terminal 100.

In some embodiments, the display 120 may receive a certain input from the user of the first terminal 100. The certain input may be an input of selecting one item of at least one or more items or an input of entering a certain text. For example, the item may have a commodity value within the application. Users of the application may purchase the item, and present the purchased item to each other as a gift.

In some embodiments, in a case where the real time broadcasting application is being executed in the first terminal 100, the input/output interface 110 may output sound. The input/output interface 110 may output the sound received through the input/output interface 110 or the sound received from the second terminal 200 or the third terminal 300 through the communication interface 140. For example, the input/output interface 110 may include a speaker (not illustrated).

In some embodiments, in a case where the real time broadcasting application is being executed in the first terminal 100, the input/output interface 110 may receive profile information received from the user of the first terminal 100 or receive a user input. For example, the profile information of the user may include at least one of a photograph, hobby information, gender information, country information and age information of the user of the terminal 100. Further, the profile information of the user may further include a video recorded by the user. In addition, the user input may be a touch input being received from the user of the terminal 100.

The memory 130 may store data. The memory 130 may store voice data, image data or profile information of the user received from the input/output interface 110. In addition, the memory 130 may store a result of computation performed by the processor 150. For example, the memory 130 may store a voice encoded by the processor 150. The memory 130 may store the data to be output to outside through the communication interface 140 or store the data received from outside through the communication interface 140.

The memory 130 may store a software or program. For example, the memory 130 may store programs and various types of data such as applications and application programming interfaces (API), etc. The memory 130 may store instructions that are executable by the processor 150.

The memory 130 may include at least one of a volatile memory or nonvolatile memory. The memory 130 may include at least one of, for example, flash memory, Read Only Memory (ROM), Electrically Erasable ROM (EEROM), Erasable Programmable ROM (EPROM), Electrically Erasable Programmable ROM (EEPROM), Hard Disk Drive (HDD) or register. The memory 130 may include, for example, a file system, database, or embedded database, etc.

The communication interface 140 may output data to outside of the terminal 100 or receive data from the outside. The communication interface 140 may output the data to the server 400 or to an external device. The communication interface 140 may receive the data from the server 400 and from the external device. The communication interface 140 may output a result of computation performed by the processor 150 to outside.

In some embodiments, in a case where the real time broadcasting application is executed in the first terminal 100, the communication interface 140 may receive an image or voice from the second terminal 200 or the third terminal 300.

Further, the communication interface 140 may transmit an item or a certain text selected by the user of the first terminal 100 to the second terminal 200 or the third terminal 300. Further, the communication interface 140 may receive an item or a certain text from the second terminal 200 or the third terminal 300.

The communication interface 140 may include a remote network interface such as 3G module, LTE module, LTE-A module, Wi-Fi module, WiGig module, Ultra Wide Band (UWB) module, and LAN card, etc. Further, the communication interface 140 may include a local network interface such as Magnetic Secure Transmission (MST) module, Bluetooth module, Near Field Communication (NFC) module, Radio Frequency IDentification (RFID) module, ZigBee module, Z-Wave module, and InfraRed communication (IR), etc. Further, the communication interface 140 may include other network interfaces.

The processor 150 or each of the components included in the processor 150 may be embodied in the form of software or hardware. For example, the software may be embodied as program execution instructions such as mechanical codes, firmware codes, embedded codes, and applications, etc. The hardware may be an electric electronic circuit, processor, computer, pressure sensor, inertia sensor, MicroElectroMechanical System (MEMS), passive elements, or a combination thereof.

The processor 150 may control operations of the terminal 100. The processor 150 may be interconnected with each of the components included in the terminal 100, and control operations of each component included in the terminal 100. The processor 150 may control the operations of the terminal 100 in response to the signal received by the input/output interface 110.

In some embodiments, in a case where the first terminal 100 executes the real time broadcasting application as a host terminal, the processor 150 may recognize the voice of the user of the first terminal 100 being received through the input/output interface 110. Further, in a case where a certain text is being received through the communication interface 140, the processor 150 may prepare to generate a voice message converted from a certain text into a voice of the user of the first terminal 100.

In some embodiments, the processor 150 may generate a voice message converted from a certain text into a voice of the user of the first terminal 100 using a prepared learning model. In other embodiments, the processor 150 may extract characteristics from the voice of the user of the first terminal 100, and generate the voice message converted from the certain text into the voice of the user of the first terminal 100 using the extracted characteristics.

Detailed operation methods of the plurality of terminals 100~300 and the server 400 may be described with reference to FIGS. 3 to 9.

Figure 3:
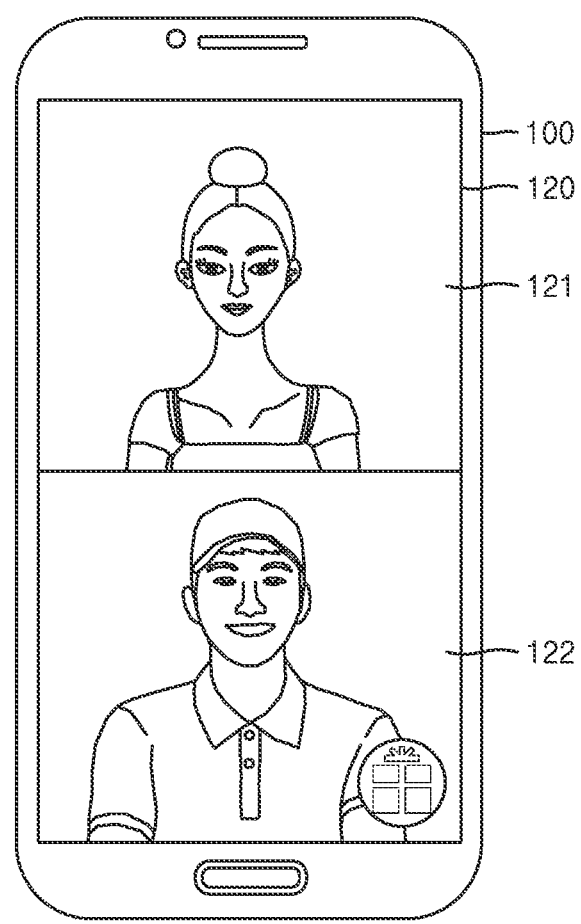
FIG. 3 is a view illustrating a method for executing a real time broadcasting application in a terminal according to an embodiment of the present disclosure.

FIG. 3 is a view illustrating a method for executing a real time broadcasting application in a terminal according to an embodiment of the present disclosure.

Referring to FIGS. 1 to 3, the user of the first terminal 100 may execute the real time broadcasting application. The user of the first terminal 100 may generate a broadcasting channel through the real time broadcasting application. The user of the first terminal 100 may perform a voice broadcasting or a video broadcasting in real time through the broadcasting channel.

In some embodiments, when the user of the first terminal 100 generates the broadcasting channel and enters the broadcasting channel, the display 120 of the first terminal 100 may be divided into at least two areas 121, 122. The first area 121, of the at least two areas 121, 122, may be allocated to the user of the first terminal 100.

In some embodiments, in a case where the user of the first terminal 100 performs a voice broadcasting, a profile photograph set by the user of the first terminal 100 may be displayed in the first area 121. In a case where the user of the first terminal 100 performs a video broadcasting, the video that the user of the first terminal 100 records may be displayed in the first area 121.

In some embodiments, the user of the second terminal 200 and the user of the third terminal 300 may enter the broadcasting channel that the user of the first terminal 100 generated. The user of the second terminal 200 and the user of the third terminal 300 may watch the broadcasting that the user of the first terminal 100 performs, as guests.

In some embodiments, at least one of the user of the second terminal 200 and the user of the third terminal 300, may directly participate in the broadcasting. If the user of the second terminal 200 directly participates in the broadcasting, the second area 122, of the at least two areas 121, 122, may be allocated to the user of the second terminal 200.

In some embodiments, in a case where the user of the second terminal 200 performs a voice broadcasting, a profile photograph that the user of the second terminal 200 set may be displayed in the second area 122. If the user of the second terminal 200 performs a video broadcasting, the video that the user of the second terminal 200 records may be displayed in the second area 122.

If the user of the second terminal 200 directly participates in a broadcasting, the user of the first terminal 100 and the user of the second terminal 200 may conduct the broadcasting together. In addition, the user of the third terminal 300 may watch the broadcasting being conducted by the user of the first terminal 100 and the user of the second terminal 200.

Figure 4:
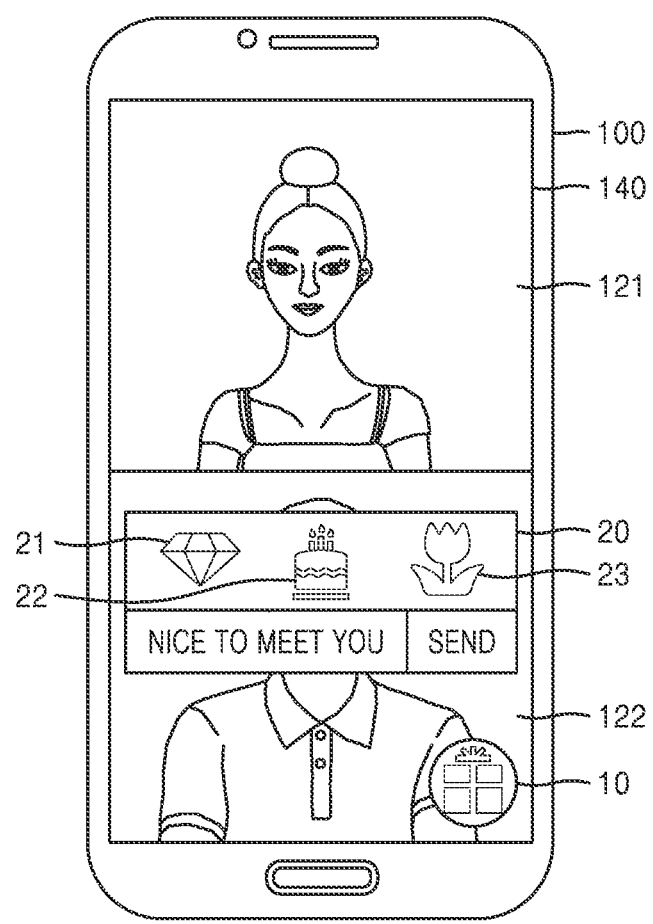
FIG. 4 is a view illustrating a method for executing a real time broadcasting application in a terminal according to another embodiment of the present disclosure.

FIG. 4 is a view illustrating a method for executing a real time broadcasting application in a terminal according to another embodiment of the present disclosure.

Referring to FIGS. 3 and 4, the user of the second terminal 200 or the user of the third terminal 300 may present an item to the user of the first terminal 100 during broadcasting. For example, the item may have a commodity value within the application. Users of the application may purchase the item, and present the purchased item to each other as a gift.

In some embodiments, the user of the second terminal 200 or the user of the third terminal 300 may touch an item gift icon 10. The item gift icon 10 may be displayed in a partial area of the display. When the user of the second terminal 200 or the user of the third terminal 300 selects the item gift icon 10, an icon popup window 20 may be displayed.

In some embodiments, in the icon popup window 11, at least one or more items 21~23 may be displayed, and the user of the second terminal 200 or the user of the third terminal 300 may select one of the at least one or more items 21~23. For example, each of the at least one or more items 21~23 may have different commodity values from one another.

The user of the second terminal 200 or the user of the third terminal 300 may select one of the at least one or more items 21~23. In some embodiments, the user of the second terminal 200 or the user of the third terminal 300 may transmit a certain text together with the selected item. For example, the user of the second terminal 200 or the user of the third terminal 300 may enter a text saying 'nice to meet you'. The user of the second terminal 200 or the user of the third terminal 300 may transmit the message saying 'nice to meet you' to the user of the first terminal 100 together with the selected item.

In other embodiments, the user of the first terminal 100 or the user of the third terminal 300 may present an item to the user of the second terminal 200 as a gift during broadcasting. The user of the second terminal 200 or the user of the third terminal 300 may select one of the at least one or more items 21~23, and the user of the first terminal 100 or the user of the third terminal 300 may transmit a certain text together with the selected item.

Figure 5:
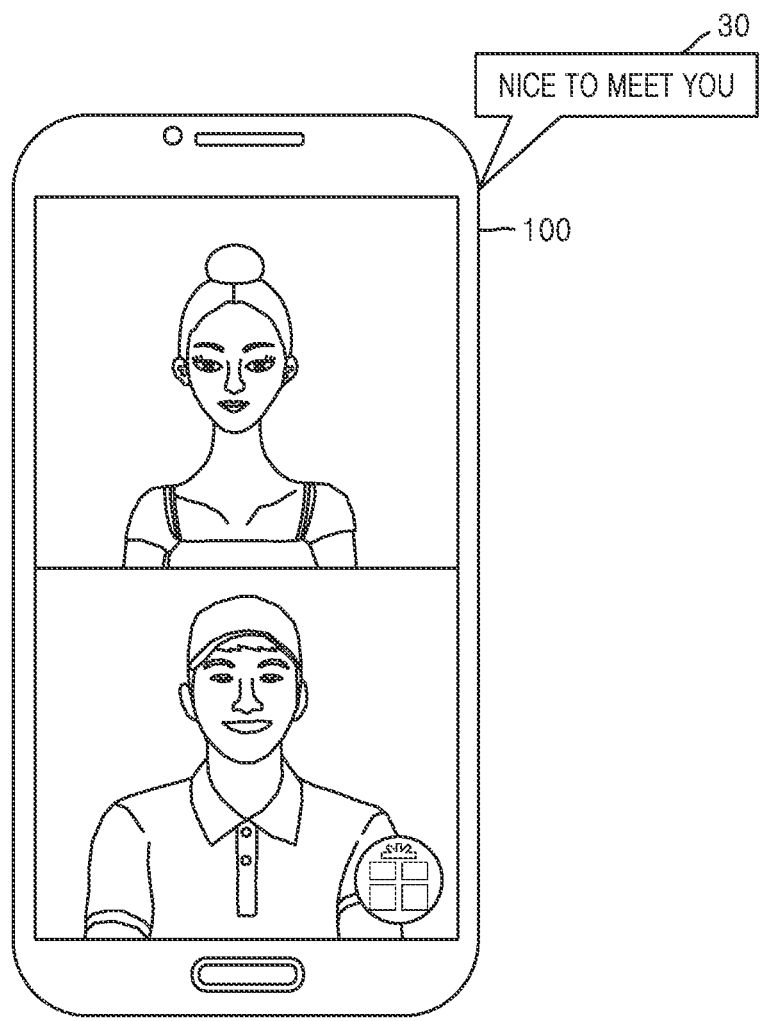
FIG. 5 is a view illustrating a method for executing a real time broadcasting application in a terminal according to another embodiment of the present disclosure.

FIG. 5 is a view illustrating a method for executing a real time broadcasting application in a terminal according to another embodiment of the present disclosure.

Referring to FIGS. 3 to 5, the certain text transmitted to the user of the first terminal 100 or the user of the second terminal together with the selected item may be converted into a voice message and be output.

In some embodiments, the certain text may be converted into a voice message using the voice of a certain user. More specifically, in a case of a certain text that the user of the second terminal 200 or the user of one of the third terminals 300 transmitted to the user of the first terminal 100, the certain text may be converted into a voice message using the voice of the user of the first terminal 100.

Otherwise, in a case of a certain text that the user of the first terminal 100 or the user of one of the third terminals 300 transmitted to the user of the second terminal 200, the certain text may be converted into a voice message using the voice of the user of the second terminal 200.

Otherwise, the certain text may be converted into a voice message using the voice of the user who transmitted the certain text. That is, in a case of a certain text that the user of the second terminal 200 transmitted to the user of the first terminal 100, the certain text may be converted into a voice message using the voice of the user of the second terminal 200.

Referring to FIG. 2, operations of generating a voice message using a certain text and the voice of a certain user may be performed in the processor 150 of the first terminal 100 or the second terminal 200. In some embodiments, the processor 150 may be generate the voice message using the prepared learning model. The method in which the processor 150 generates the voice message using the prepared learning model may be described with reference to FIG. 6.

In other embodiments, the processor 150 may extract characteristics of a certain voice, and generate a voice message using the extracted characteristics. The method in which the processor 150 generates a voice message using the characteristics of a certain voice may be described with reference to FIG. 7.

In some embodiments, in a case of converting a certain text into a voice message using the voice of the user of the first terminal 100, the conversion may be performed in the processor 150 of the first terminal 100. In addition, the generated voice message may be transmitted to the second terminal 200 and the third terminal 300.

In other embodiments, in a case of converting a certain text into a voice message using the voice of the user of the second terminal 200, the conversion may be performed in the processor 150 of the second terminal 200. In addition, the generated voice message may be transmitted to the first terminal 100 and the third terminal 300.

Figure 6:
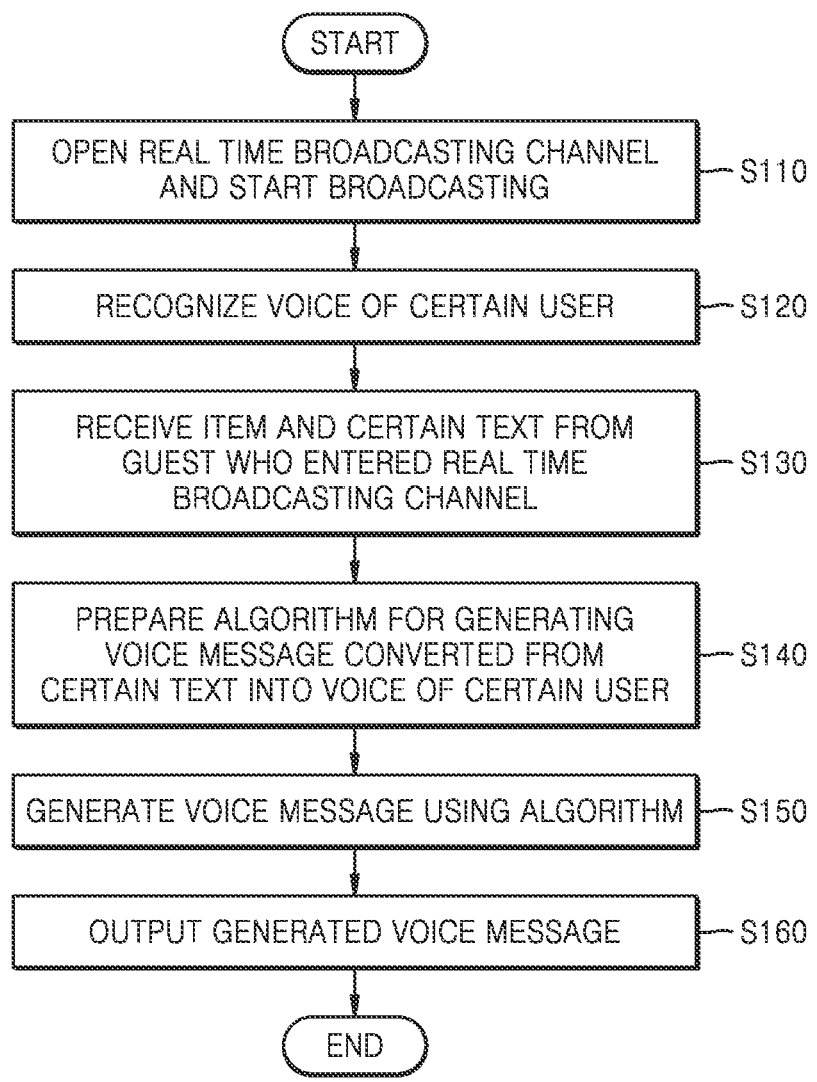
FIG. 6 is a flowchart for illustrating a method for converting a text into a voice message in a terminal according to an embodiment of the present disclosure.

FIG. 6 is a flowchart for illustrating a method for converting a text into a voice message in a terminal according to an embodiment of the present disclosure.

Referring to FIGS. 2 to 6, at step S110, the user of the first terminal 100 may open a real time broadcasting channel, and start broadcasting. More specifically, the user of the first terminal 100 may generate the broadcasting channel through a real time broadcasting application. The user of the first terminal 100 may perform a voice broadcasting or a video broadcasting in real time through the broadcasting channel.

At step S120, the processor 150 of the first terminal 100 may recognize the voice of a certain user. For example, the certain user may be the user of the first terminal 100. In some embodiments, the processor 150 of the first terminal 100 may recognize the voice of the user of the first terminal 100 being received in the input/output interface 110 during broadcasting. More specifically, of the audio data being input into the input/output interface 110, the processor 150 may recognize the voice of the user of the first terminal 100, and extract the recognized voice of the user of the first terminal 100.

At step S130, the first terminal 100 may receive an item and a certain text from a guest who entered the real time broadcasting channel that the user of the first terminal 100 opened in real time through the communication interface 140. In some embodiments, at least one or more guests may participate in the real time broadcasting channel, and an item and a certain text may be received from a certain guest of the at least one or more guests. The received item and the certain text may be transmitted to the processor 150.

At step S140, the processor 150 of the first terminal 100 may prepare an algorithm for generating a voice message converted from a certain text into the voice of a certain user. For example, the prepared algorithm may be a data recognition model being used to convert the certain text into the voice message using the voice of the certain user. The data recognition model may be a model that is based on a neural network. For example, the learning models such as a Deep Neural Network (DNN), Recurrent Neural Network (RNN), and Bidirectional Recurrent Deep Neural Network (BRDNN) may be used as the data recognition model, but there is no limitation thereto.

The prepared learning model may be a learning model for generating a voice message converted from a certain text into a certain voice. The learning model for generating the voice message may be a result of learning a correlation regarding a plurality of voices, a plurality of texts, and voice messages converted from the plurality of texts into the plurality of voices, respectively.

For example, the processor 150 of the first terminal 100 may learn a correlation between a certain voice, a certain text, and a voice message converted from the certain text into the certain voice. The terminal 100 may exercise an artificial neural network based on the result of learning, and generate a learning model.

In another example, the terminal 100 may receive a learning model for generating a voice message from the server 400. In this case, the server 400 may generate a learning model that learned the correlation between a certain voice, a certain text, and a voice message converted from the certain text into the certain voice, and provide an application that includes the generated learning model to the terminal 100.

At step S150, the processor 150 of the first terminal 100 may generate a voice message using the algorithm. More specifically, the processor 150 of the first terminal 100 may apply the voice of a certain user and a certain text to the algorithm and generate the voice message. The voice message may be a result of the certain text converted into the voice of the certain user.

At step S160, the first terminal 100 may output the generated voice message. More specifically, the first terminal 100 may output the voice message through the input/output interface 110. Otherwise, the first terminal 100 may output the voice message through the communication interface 140.

Figure 7:
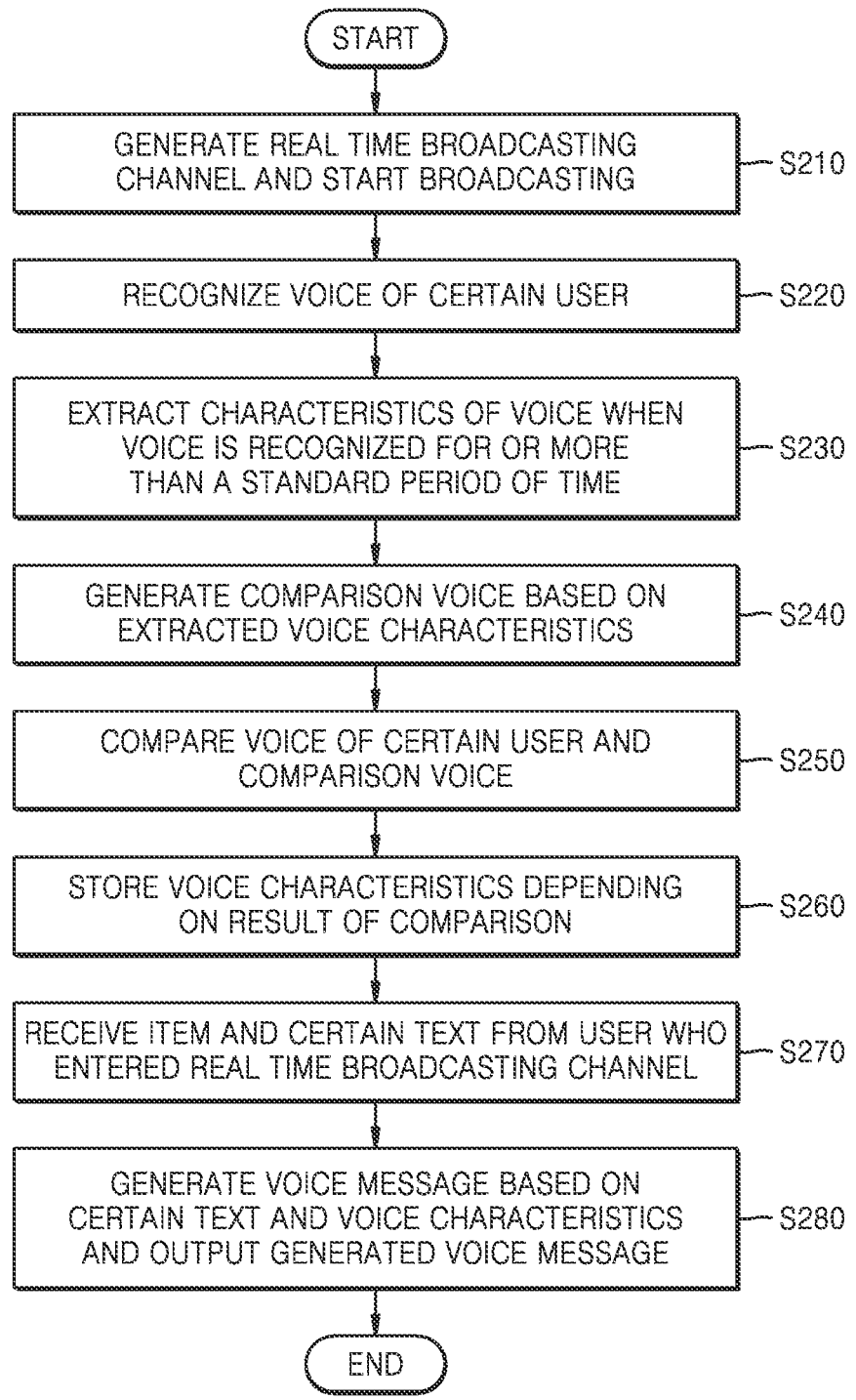
FIG. 7 is a flowchart for illustrating a method for converting a text into a voice message in a terminal according to another embodiment of the present disclosure.

FIG. 7 is a flowchart illustrating a method for converting a text into a voice message in a terminal according to another embodiment of the present disclosure.

Referring to FIGS. 1 to 5 and 7, at step S210, the user of the first terminal 100 may open a real time broadcasting channel, and start broadcasting. More specifically, the broadcasting channel may be generated through a real time broadcasting application. The user of the first terminal 100 may perform a voice broadcasting or a video broadcasting in real time through the broadcasting channel.

At step S220, the processor 150 of the first terminal 100 may recognize the voice of a certain user. For example, the certain user may be the user of the first terminal 100. More specifically, the processor 150 of the first terminal 100 may recognize the voice of the user of the first terminal 100 being received in the input/output interface 110 during broadcasting. Further, the voice of the user of the first terminal 100 may be stored in the memory 130.

At step S230, when the voice of a certain user is recognized for or more than a standard period of time, the processor 150 of the first terminal 100 may extract characteristics of the voice. For example, the characteristics of the voice may mean a voice-specific accent, frequency brand, formant and pitch, etc. That is, voice characteristics may mean the voice-specific characteristics that can form the corresponding voice.

At step S240, the processor 150 of the first terminal 100 may generate a comparison voice based on the extracted voice characteristics. In addition, at step S250, the processor 150 of the first terminal 100 may compare the voice of a certain user and the generated comparison voice.

At step S260, the processor 150 of the first terminal 100 may store the voice characteristics in the memory 130 depending on the result of comparison. In some embodiments, when an error between the voice of the certain user and the comparison voice is not more than a standard value, the processor 150 may store the voice characteristics in the memory. For example, the error may be calculated through a difference of sampling values between the voice of the certain user and the comparison voice. The method for calculating the error between the voice of a certain user and the comparison voice is not limited thereto, and may be calculated using various methods.

In some embodiments, in a case where a noise is recognized as the voice of the user of the first terminal 100 during voice recognition, the comparison voice generated using the extracted voice characteristics may have a large error compared to the voice of the user of the first terminal 100. Therefore, in order to generate a voice that is similar to the voice of the user of the first terminal 100 using the voice characteristics, the processor 150 may perform a process of generating the comparison voice using the voice characteristics, and comparing the voice of the user of the first terminal 100 and the comparison voice.

At step S270, the first terminal 100 may receive an item and a certain text from a guest who entered the real time broadcasting channel that the real time user of the first terminal 100 opened through the communication interface 140. In some embodiments, at least one or more guests may participate in the real time broadcasting channel, and an item and a certain text may be received from a certain guest of these guests. The received item and the certain text may be transmitted to the processor 150.

At step S280, the processor 150 of the first terminal 100 may generate a voice message based on the certain text and the voice characteristics and output the generated voice message. In some embodiments, the voice message that the processor 150 generated based on the voice characteristics may be similar or identical to the voice of a certain user. The first terminal 100 may output the voice message through the input/output interface 110. Otherwise, the first terminal 100 may output the voice message through the communication interface 140.

Figure 8:
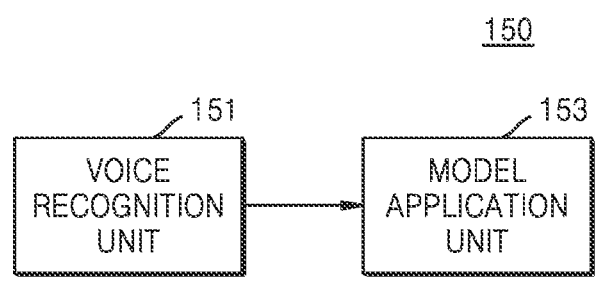
FIG. 8 is a view illustrating a processor of a terminal according to an embodiment of the present disclosure.

FIG. 8 is a view illustrating the processor of a terminal according to an embodiment of the present disclosure.

Referring to FIGS. 1, 2, 6 and 8, the processor 150 of the first terminal 100 may include a voice recognition unit 151 and a model application unit 153. Each of the second terminal 200 and the third terminal 300 illustrated in FIG. 1 may be embodied similarly or identically as the first terminal 100.

The voice recognition unit 151 may recognize the voice of the user of the first terminal 100 of the audio data being input into the input/output interface 110 of the first terminal 100 during broadcasting, and extract the recognized voice. In some embodiments, the voice recognition unit 151 may analyze the input audio data and distinguish the input audio data into a voice section and a non-voice section. The voice recognition unit 151 may exclude the audio data included in the non-voice section, and recognize the voice of the audio data included in the voice section, and transmit the recognized voice to the model application unit 153.

The model application unit 153 may apply the voice of the user of the first terminal 100 and the certain text received from outside to the algorithm and generate a voice message. In some embodiments, the learning model for generating the voice message may be a result of learning the correlation between a certain voice, a certain text and a voice message converted from the certain text into the certain voice.

Figure 9:
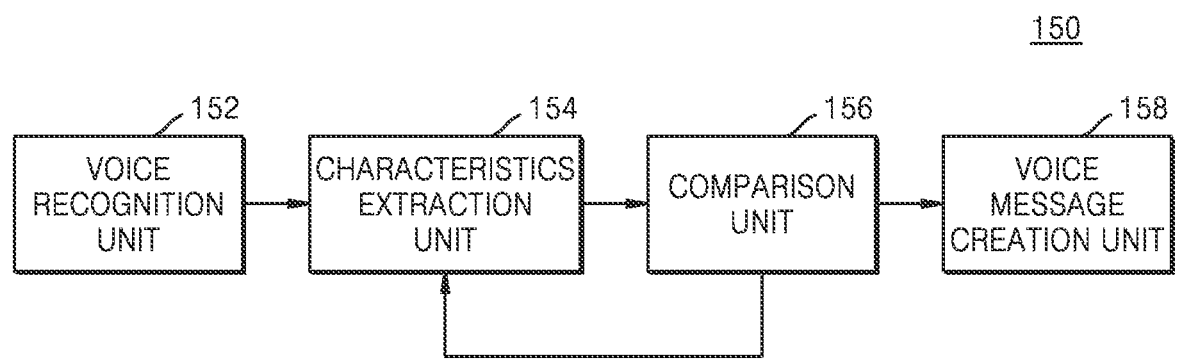
FIG. 9 is a view illustrating a processor of a terminal according to another embodiment of the present disclosure.

FIG. 9 is a view illustrating a processor of a terminal according to another embodiment of the present disclosure.

Referring to FIGS. 1, 2, 7 and 9, the processor 150 of the first terminal 100 may include a voice recognition unit 152, a characteristics extraction unit 154, a comparison unit 156, and a voice message creation unit 158. Each of the second terminal 200 and the third terminal 300 illustrated in FIG. 1 may be embodied similarly or identically as the first terminal 100.

The voice recognition unit 152 illustrated in FIG. 9 may operate similarly or identically as the voice recognition unit 151 illustrated in FIG. 8. The voice recognition unit 152 may recognize the voice of the audio data included in the voice section, and transmit the recognized voice to the characteristics extraction unit 154.

The characteristics extraction unit 154 may extract the characteristics of the voice of the user of the first terminal 100. For example, the voice characteristics may mean the voice-specific accent, frequency band, formant and pitch, etc. That is, the voice characteristics may mean the voice-specific characteristics that can make the corresponding voice. The characteristics extraction unit 154 may generate a comparison voice using the extracted voice characteristics.

The comparison unit 156 may compare the voice of the user of the first terminal 100 and the comparison voice. The comparison unit 156 may store the voice characteristics in the memory 130 depending on the result of comparison.

In some embodiments, when the error between the voice of the user of the first terminal 100 and the comparison voice is not more than the standard value, the processor 150 may store the voice characteristics in the memory 130, and transmit the voice characteristics to the voice message creation unit 158.

For example, the error may be calculated through a difference of sampling values between the voice of the user of the first terminal 100 and the comparison voice. The method for calculating the error between the voice of the user of the first terminal 100 and the comparison voice is not limited thereto, and various methods may be used in the calculation.

If the error between the voice of the user of the first terminal 100 and the comparison voice exceeds the standard value, the comparison unit 156 may transmit a feedback signal to the characteristics extraction unit 154. When the feedback signal is received in the characteristics extraction unit 154, the characteristics extraction unit 154 may extract the characteristics from the voice of the user of the first terminal 100 once again.

The voice message creation unit 158 may generate a voice message based on a certain text and the voice characteristics, and output the generated voice message.

Referring to FIGS. 1 to 9, each of the plurality of terminals 100~300 according to an embodiment of the present disclosure may perform real time broadcasting more effectively.

Further, each of the plurality of terminals 100~300 may provide a service for expanding human relations through a real time broadcasting service.

The embodiments described above may also be embodied in a recording medium form that includes instructions executable by a computer such as a program module executable by a computer. The computer readable media may be any available media accessible by a computer, and may include all volatile and non-volatile media, and separable and non-separable media.

Further, the computer readable media may include computer storage media or communication media. The computer storage media may include all volatile and non-volatile, and separable and non-separable media embodied in any method or technology for storage of information such as computer readable instructions, data structures and program modules or other data. The communication media may include computer readable instructions, data structures, program modules, or other data of modulated data signals such as carrier waves, or other output mechanisms, and may include any information delivery media.

The embodiments of the present disclosure were described above with reference to the drawings attached, but those skilled in the art that the present disclosure pertains to will understand that the present disclosure can be implemented in other specific forms without modifying the technical spirit or essential features of the present disclosure. Therefore, it should be understood that the above-described embodiments are illustrative in all respects and not restrictive.

What is claimed:

1. An operating method of a host terminal that provides a service for performing a real time broadcasting, the operating method comprising:
performing the real time broadcasting for guest terminals of a plurality of guests;
extracting voice characteristics of a certain user from a voice of the certain user;
generating a comparison voice based on the extracted voice characteristics;
comparing the voice of the certain user and the comparison voice, wherein comparing the voice of the certain user and the comparison voice comprises calculating an error of sampling values between the voice of the certain user and the comparison voice;
storing the voice characteristics depending on a result of the comparison;
obtaining a first text;
generating a first voice message converted from the first text into the voice of the certain user based on the stored voice characteristics of the certain user; and
transmitting the first voice message to the guest terminals at the real time broadcasting.

2. The operating method of claim 1, wherein the certain user is a host of the host terminal and the first text is received from a first guest terminal of a first guest among the plurality of guests.

3. The operating method of claim 1, wherein the certain user is a first guest, who transmits the first text, among the plurality of guests.

4. The operating method of claim 1, wherein the certain user is a host of the host terminal and the first text is inputted by the host.

5. The operating method of claim 1, wherein
storing the voice characteristics depending on the result of the comparison comprises storing the voice characteristics in response to the error of the sampling values not exceeding a standard value.

6. The operating method of claim 1, wherein:
obtaining the first text comprises receiving the first text with at least one item from a first guest among the plurality of guests, and
the at least one item has commodity values within the service.

7. The operating method of claim 1, further comprising:
receiving an input for selecting at least one item to be transmitted to a first guest terminal of a first guest among the plurality of guests; and
transmitting the at least one item to the first guest terminal, wherein the at least one item has commodity values within the service.

8. A non-transitory computer-readable storage medium storing instructions that, when executed by a processor, are configured to cause the processor to perform operations for performing a real time broadcasting, the operations comprising:
performing the real time broadcasting for guest terminals of a plurality of guests;
extracting voice characteristics of a certain user from a voice of the certain user;
generating a comparison voice based on the extracted voice characteristics;
comparing the voice of the certain user and the comparison voice, wherein comparing the voice of the certain user and the comparison voice comprises calculating an error of sampling values between the voice of the certain user and the comparison voice;

storing the voice characteristics depending on a result of the comparison;

obtaining a first text;

generating a first voice message converted from the first text into the voice of the certain user based on the stored voice characteristics of the certain user; and transmitting the first voice message to the guest terminals at the real time broadcasting.

9. The non-transitory computer-readable storage medium of claim 8, wherein:

the certain user is a host of the real time broadcasting; and the first text is at least one of:

text received from a first guest terminal of a first guest among the plurality of guests; and text input by the host.

10. The non-transitory computer-readable storage medium of claim 8, wherein the certain user is a first guest, who transmits the first text, among the plurality of guests.

11. The non-transitory computer-readable storage medium of claim 8, wherein storing the voice characteristics depending on the result of the comparison comprises storing the voice characteristics in response to the error of the sampling values not exceeding a standard value.

12. The non-transitory computer-readable storage medium of claim 8, wherein:

obtaining the first text comprises receiving the first text with at least one item from a first guest among the plurality of guests; and the at least one item has commodity values.

13. The non-transitory computer-readable storage medium of claim 8, wherein the operations further comprise:

receiving an input for selecting at least one item to be transmitted to a first guest terminal of a first guest among the plurality of guests; and transmitting the at least one item to the first guest terminal, wherein the at least one item has commodity values.

14. A host terminal that provides a service for performing a real time broadcasting comprising:

a communication interface;

a processor; and a memory configured to store instructions executable by the processor, wherein the processor is configured to execute the instructions for:

performing a real time broadcasting for guest terminals of a plurality of guests, extracting voice characteristics of a certain user from a voice of the certain user;

generating a comparison voice based on the extracted voice characteristics;

comparing the voice of the certain user and the comparison voice, wherein comparing the voice of the certain user and the comparison voice comprises calculating an error of sampling values between the voice of the certain user and the comparison voice;

storing the voice characteristics depending on a result of the comparison;

obtaining a first text;

generating a first voice message converted from the first text into the voice of the certain user based on the stored voice characteristics of the certain user; and transmitting the first voice message to the guest terminals at the real time broadcasting through the communication interface.

15. The host terminal of claim 14, wherein the certain user is a host of the host terminal and the first text is received from a first guest terminal of a first guest among the plurality of guests through the communication interface.

16. The host terminal of claim 14, wherein the certain user is a first guest, who transmits the first text, among the plurality of guests.

17. The host terminal of claim 14, wherein the certain user is a host of the host terminal and the first text is inputted by the host thorough an input/output interface of the host terminal.

18. The host terminal of claim 14, wherein the processor is further configured to store the voice characteristics in response to the error of the sampling values being not more than a standard value.

19. The host terminal of claim 14, wherein the processor is further configured to execute instructions to receive the first text and at least one item from a first guest terminal of a first guest among the plurality of guests through the communication interface, wherein the at least one item has commodity values within the service.

20. The host terminal of claim 14, wherein the processor is further configured to execute instructions to receive an input for selecting at least one item to be transmitted to a first guest terminal of a first guest among the plurality of guests through an input/output interface of the host terminal and transmit the at least one item to the first guest terminal through the communication interface, wherein the at least one item has commodity values within the service.

\* \* \* \* \*